US006482012B1

(12) United States Patent
Nocera et al.

(10) Patent No.: US 6,482,012 B1
(45) Date of Patent: *Nov. 19, 2002

(54) METHOD FOR DEVELOPING ANSWER-OPTIONS TO ISSUE-QUESTIONS RELATING TO CHILD-DEVELOPMENT

(75) Inventors: Tina M. Nocera, Nutley, NJ (US); Catherine S. Banat, New York, NY (US); Sarah C. Lee, New York, NY (US)

(73) Assignee: Nocera and Associates, LLC, Nutley, NJ (US)

(*) Notice: Subject to any disclaimer, the term of this patent is extended or adjusted under 35 U.S.C. 154(b) by 155 days.

This patent is subject to a terminal disclaimer.

(21) Appl. No.: 09/705,322

(22) Filed: Nov. 3, 2000

Related U.S. Application Data

(63) Continuation-in-part of application No. 09/197,156, filed on Nov. 20, 1998, now Pat. No. 6,193,518.

(51) Int. Cl.[7] .......................... G09B 19/00; G09B 3/00; G09B 7/00
(52) U.S. Cl. ........................................ 434/236; 434/322
(58) Field of Search ................................. 434/236, 237, 434/238, 322

(56) References Cited

U.S. PATENT DOCUMENTS

| | | | |
|---|---|---|---|
| 4,863,384 A | 9/1989 | Slade | 434/107 |
| 5,590,360 A | 12/1996 | Edwards | 695/800 |
| 5,725,384 A | 3/1998 | Ito et al. | 434/350 |
| 5,820,386 A | 10/1998 | Sheppard, II | 434/322 |
| 5,822,743 A | 10/1998 | Gupta et al. | 706/60 |
| 5,822,745 A | 10/1998 | Hekmatpour | 706/59 |

(List continued on next page.)

OTHER PUBLICATIONS

Marks, "We Have a Problem," Educational Record pp. 55–59, Jun. 1991.

Gruner & Jahr USA Publishing, www.parents.com, Dec. 1997.

Lisa Connors McDonough, "He Started It?", Child, Dec. 1997.

Nancy Sasmalin, Catherine Whitney, "Why Can't I?", Parents, Oct. 1997.

(List continued on next page.)

Primary Examiner—John Edmund Rovnak
(74) Attorney, Agent, or Firm—Ernest D. Buff & Associates, LLC; Ernest D. Buff; Cherie Ann Sherman (57) ABSTRACT

Information concerning child development is developed and stored in first and second data sets containing topics and issue-questions related thereto. The information is accessed from these data sets by selectively combining an issue-question with at least one topic to produce a primary information product. A program means associated with the data sets modifies the primary information product by imposing thereon a plurality of answer-options to the selected issue-question. Each of the answer-options comprises at least one expert opinion and one parent-expert opinion, stored in third and fourth data sets. The imposition of answer-options on the information product produces a polycentric information product, which is readily communicated by oral, written or electronic means. Advantageously, the method provides to a parent, grandparent, child, teacher, nurse, caregiver, baby-sitter, or other user or viewer, an information product that is directed specifically to the concerns of that user. The polycentric information product may be presented to the user via a computer, television, videotape, digital-video-disk (DVD), CD-ROM, a newsletter, and other oral and written communication means, electronically or otherwise.

34 Claims, 3 Drawing Sheets

U.S. PATENT DOCUMENTS

| | | | |
|---|---|---|---|
| 5,835,683 A | 11/1998 | Corella et al. | 395/75 |
| 5,835,900 A | 11/1998 | Fagg, III et al. | 706/11 |
| 5,862,223 A | 1/1999 | Walker et al. | 380/25 |
| 5,974,406 A | 10/1999 | Bisdikian et al. | 707/71 |
| 6,021,119 A | 2/2000 | Derks et al. | 370/261 |
| 6,026,148 A | 2/2000 | Dworkin et al. | 379/88.18 |
| 6,064,978 A | 5/2000 | Gardner et al. | 705/10 |
| 6,094,675 A | 7/2000 | Sunanga et al. | 709/204 |
| 6,112,049 A | 8/2000 | Sonnenfeld | 434/350 |
| 6,128,646 A | 10/2000 | Miloslavsky | 709/206 |
| 6,164,974 A | 12/2000 | Carlile et al. | 434/322 |
| 6,193,518 B1 * | 2/2001 | Nocera | 434/236 |

OTHER PUBLICATIONS

Anthony E. Wolf, Ellen H. Parlapiano, "Age–by–Age Guide to Bad Habits," Child, Aug. 1996.

Margarey D. Rosen, "Discipline Workshop: 'Our 4–Year–Old Uses Profanity', " Child, Aug. 1996.

Relevant Web Site: www.webmd.com—Reference Article "The Importance of Parents' Concerns About their Child's Development." Author: Glascoe FP; Altemeier WA; MacLean WE (Jul. 31, 1989).

* cited by examiner

METHOD FOR DEVELOPING ANSWER-OPTIONS TO ISSUE-QUESTIONS RELATING TO CHILD-DEVELOPMENT

CROSS-REFERENCE TO RELATED APPLICATIONS

This is a continuation-in-part of U.S. application Ser. No. 09/197,156, filed Nov. 20, 1998 now U.S. Pat. No. 6,193,518.

BACKGROUND OF THE INVENTION

1. Field of the Invention

The present invention relates to educational information systems for creating and distributing syndicated content; more particularly, to a database of questions and answers covering a myriad of parenting topics in a broadly accessible virtual manual format.

2. Description of the Prior Art

Child rearing and development today presents challenges somewhat different than those addressed by our parents and grandparents. Previous generations could rely on a large familial support system (i.e., the nuclear family) for help with child-rearing and other family issues. Today's caregivers, including parents, nannies, baby-sitters, teachers, nurses, and the like, do not enjoy the benefits afforded by this singular resource for valuable advice. A particularly advantageous feature provided by the nuclear family, and frequently missing today, is the ability to solicit and consider a variety of views on a particular issue—views that come from personal experience, subject matter experts (i.e., grandparents), and various other sources. This opportunity for consideration of divergent views on an issue better equips the caregiver to develop an informed decision on how best to handle that issue.

Information is presently available for a wide variety of child-rearing and development issues. The quantum of literature addressing these issues becomes readily apparent upon perusal of library or bookstore shelves. Some of the literature deals with specific issues in excruciating detail (e.g., toilet training). Other literature addresses a whole host of subjects (e.g., the toddler years). A major problem with such literature is the tendency for presentation of singular points of view, typically the authors'. These one size fits all presentations do not apply to child rearing and development. For this endeavor, numerous views concerning each issue afford far greater value to the caregiver. Literature references which are comprehensive enough to address the numerous issues important to each care-giver, and which offer a variety of views on these important issues, i.e., a "child's user guide", are virtually non-existent owing to the myriad of variables involved.

There remains a need in the art for a method and means for providing caregivers with access to multi-facetted points-of-view for the child-rearing and development issues that are most important to the caregivers.

SUMMARY OF THE INVENTION

The present invention provides a method for providing to a user answer-options to issue-questions relating to child development. The method comprises the steps of identifying a plurality of topics relating to child development based upon predetermined criteria; developing and recording a plurality of issue-questions directed to each of the identified child development topics; developing and recording an expert opinion for each issue-question; developing and recording a parent-expert opinion for each issue-question; selecting a topic; selecting an issue-question directed to the selected topic; and communicating a plurality of answer-options to the selected issue-question, the plurality of answer-options comprising at least one expert opinion and one parent-expert opinion and being communicated orally, in writing, or electronically. The present invention may be used with or without the aid of a general-purpose computer.

In another aspect of the present invention, information concerning child development is developed and stored as at least one database (obviously, more than one database may also be used in connection with the present invention) in a memory storage device of a general purpose computer as first and second data sets containing topics and issue-questions related thereto. The information is accessed from these data sets by selectively combining an issue-question with at least one topic to produce a primary information product. A program means associated with the data sets modifies the primary information product by imposing thereon a plurality of answer-options to the selected issue-question. Each of the answer-options comprises at least one expert opinion and one parentexpert opinion, stored in third and fourth data sets. The imposition of answer-options on the information product produces a polycentric information product, which is readily communicated to the caregiver or user of the present invention by oral, written or electronic means.

BRIEF DESCRIPTION OF THE DRAWINGS

The invention will be more fully understood and further advantages will become apparent when reference is made to the following detailed description of the preferred embodiments of the invention and the accompanying drawings wherein.

DESCRIPTION OF THE PREFERRED EMBODIMENTS

The present invention is directed to a method of providing a variety of answers to the numerous questions and issues related to child rearing and development. The present invention may be tailored to a specific user or audience such as, for example, parents, teachers, grandparents, baby-sitters, children (e.g., toddlers, teens, etc.), etc. By considering numerous variables including geographic location and age of the child, the present invention can identify the topics most important to a specific user, prioritize these topics, and develop specific questions directed to each of the prioritized topics. The specific questions or issue-questions, are then presented to a panel of experts including child psychologists, psychiatrists, pediatricians, nurses, etc., to elicit answers from each expert for each issue-question. The issue-questions are also presented to a panel of parent-experts who each offer their opinion to the issue-question based on personal experience. The result is a plurality of perspectives or answer-options directed to each issue-question that are communicated to the user. The answer-options are preferably comprised of at least one expert opinion and at least one parent-expert opinion. The user thus benefits from the various views of the experts and parent-experts, and can consider the answer-options provided in addressing the specific issue that the user has identified as being important (based upon market research and other statistically gathered data).

The present invention may be used for production of a product series that includes, but is not limited to, television shows and video-tapes for caregivers and children, CD-ROMs, computer-based training ("CBT") products for caregivers and children, print publications including a newsletter, web pages (i.e., the world-wide web), and other now available or hereafter developed communication media and technology.

As used herein, the term caregiver refers to any person responsible for the care of a child, regardless of that person's relation to the child, the child's age and where the care is administered. The term parent-expert refers to persons identified as having actual experience with specific child-rearing and development issues, situations, etc., regardless of whether that person is in fact a parent. The terms child and children refer to persons between the ages of 0 and 18 years. The terms user and viewer are used herein to identify any person benefiting from the present invention.

Figure 1:
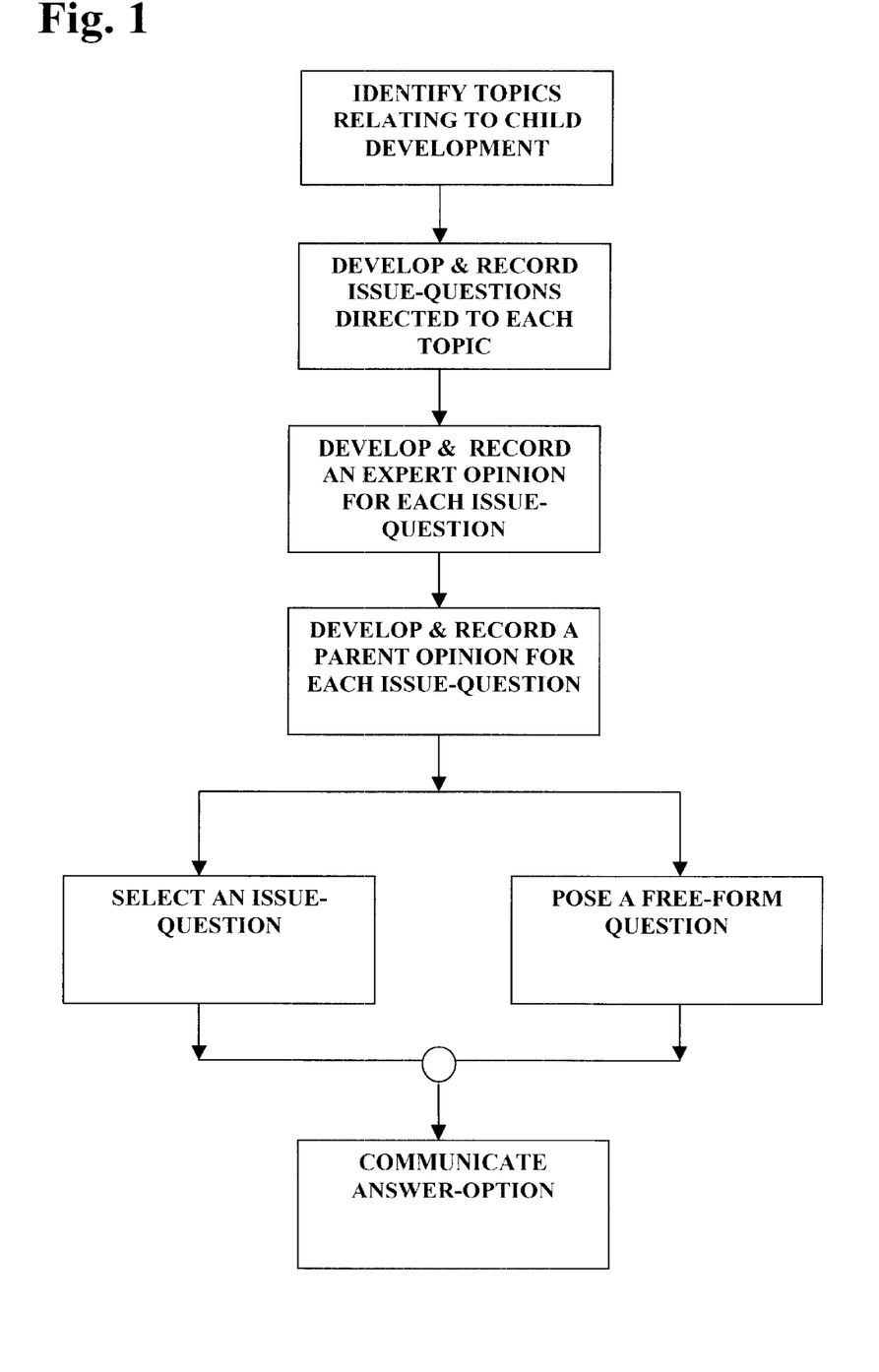
FIG. 1 is a flow diagram of the method of the present invention.

Referring now to the drawings, FIG. 1 is a flow diagram of a preferred embodiment of the present invention. A specific group of topics relating to child rearing and development are first identified. The topics may include: 1) toddler issues; 2) child care choices; 3) surviving marriage with children; 4) non traditional families; 5) preventing accidents; 6) how to have a happy family; 7) preventing and recognizing child abuse; 8) mainstreaming a handicapped child; 9) working parents' guilt; 10) raising a socially conscious child (respect for others, and the environment); 11) ensuring good nutrition; 12) single parenting; 13) fathering today; 14) grand parenting today; 15) the middle years; 16) surviving the teen years; 17) sibling rivalry; 18) helping children deal with crisis (death, divorce); 19) raising a gifted child; 20) helping your child become a good student; 21) helping your child choose a successful career; 22) how to discipline with love; 23) raising street smart kids; 24) teaching the value of money; 25) families handling everyday stress; 26) building self-esteem; 27) dealing with infertility; and 28) relocating a family. It will be obvious to persons skilled in the art that these topics are merely illustrative, and that the topics considered by the present invention are limited only by the imagination of a routineer in the art. The group of topics may be identified using surveys of parents, focus groups, statistical data (i.e., data gathered by a third party directed to child-rearing and development), and various other information and data gathering sources and means.

Once the group of topics is identified, specific issue-questions directed to each topic are developed. These issue-questions may be developed using sources and means similar to those used for identification of the topics described above. The specific issues an intended audience will have for the various topics depends on factors such as audience composition (i.e., caregivers, children, etc.), age of the child, location of the family (i.e., city, suburb, country, etc.), socio-economic class of the family, and other factors. Thus, the specific questions must be developed by considering these and other variables so that the information provided by the present invention in the way of answer-options (described in more detail below) is meaningful and useful for the desired target audience, whether it be parents, grandparents, teachers, children, or whomever.

The issue-questions are then presented to a panel of experts in the field of child rearing and development. The panel may include child psychologists, psychiatrists, pediatricians, nurses, teachers, and others having child-rearing and development experience and knowledge. Each expert provides his/her answer to the issue-question, thus providing a plurality of theoretical expert opinions as answer-options on the specific issue-question. Providing various perspectives on a single subject that is particularly important to the intended audience as previously identified by the development of topic groups and issue-questions, has heretofore not been available from a single source, as is the case with the present invention. Previously, persons having child-rearing and development questions must consult numerous sources of information to obtain the same quantum of information as provided by the present invention. In addition, the information provided by the present invention is specific in that it addresses those issues identified as being the most important to the target audience.

The issue-questions are also presented to a panel of parent-experts who bring their practical experience to bear on the issues most important to audience. The parent-experts each provide his/her opinion on the issue-question, and collectively provide a variety of views and perspectives as answer-options on each issue-question. Thus, the expert panel provides primarily theoretical views and the parent-experts provide primarily practical views on the questions and issues identified as most important by the target audience. The opinions of the expert panel and parent-experts are provided as a plurality of answer-options that may be considered by the audience or user.

For the broadcast, videotape and DVD media, the issue-questions can be presented to the expert and parent-expert panels in the form of a question and answer interchange conducted by a moderator. The experts and parent-experts can individually respond to the issue-question thus providing a plurality of answer-options that expose the audience to a plurality of views on a question that has particular relevance and importance to them. This question and answer format can be repeated until the topic is thoroughly explored.

Figure 3:
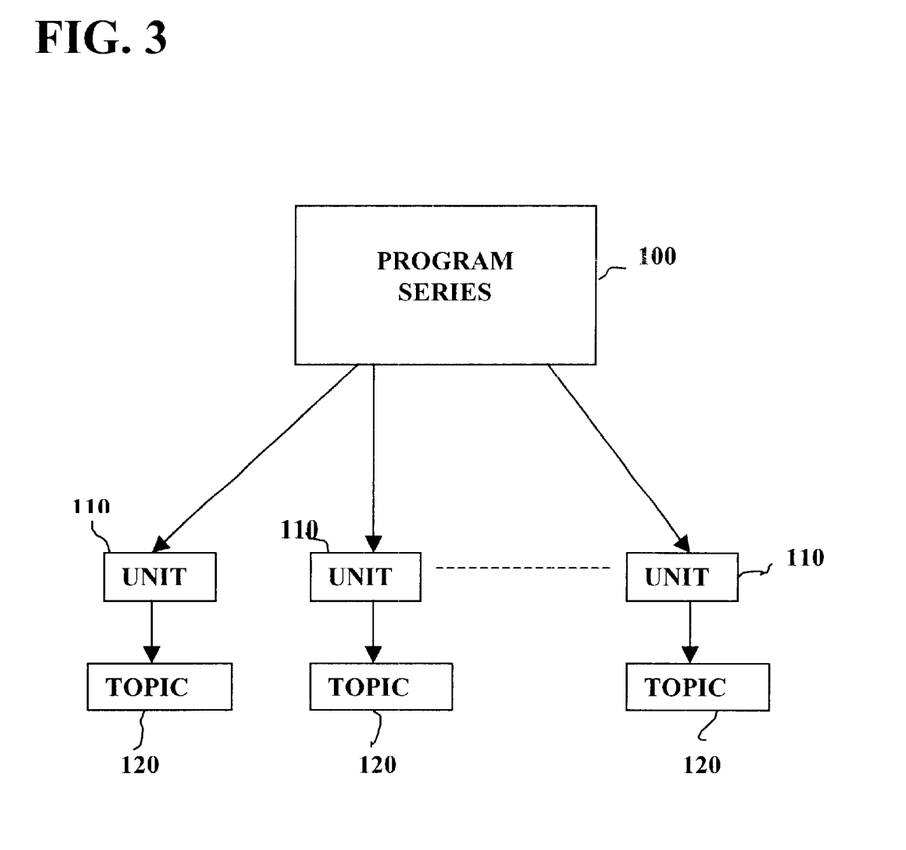
FIG. 3 is a block diagram of the components of a program series developed in accordance with the method of the present invention.

In a preferred embodiment, and with reference to FIG. 3, the present invention is used in the development of a program series 100 that can be broadcast on television, cable, pay-per-view, radio and the like, downloaded to wireless devices such as personal digital assistants (PDAs), recorded on video-tape or digital-video disk (DVD), or stored on CD-ROM for use on a general purpose computer. The program series 100 includes a number of individual program units 110, with each program unit 110 addressing a specific topic 120 and fully exploring a broad range of issue-questions directed to that topic 120. For this embodiment, a program series 100 developed in accordance with the present invention will be comprised of a plurality of program units 110, each directed to a specific, single topic 120. Alternatively, the program series 100 may be comprised of a plurality of program units that address a number of topics.

In a most preferred embodiment, the present invention is used in connection with the development and production of a television (network, cable, or otherwise) program format that regularly provides the described specific information. A typical program topic is sibling rivalry. Issue-questions concerning the topic are posed to guests on the show who are professional and practical consultants. The live audience votes on the responses to issue-questions offered by the consultants using a keyboard device, via telephone call in, or other well-known methods.

Figure 2:
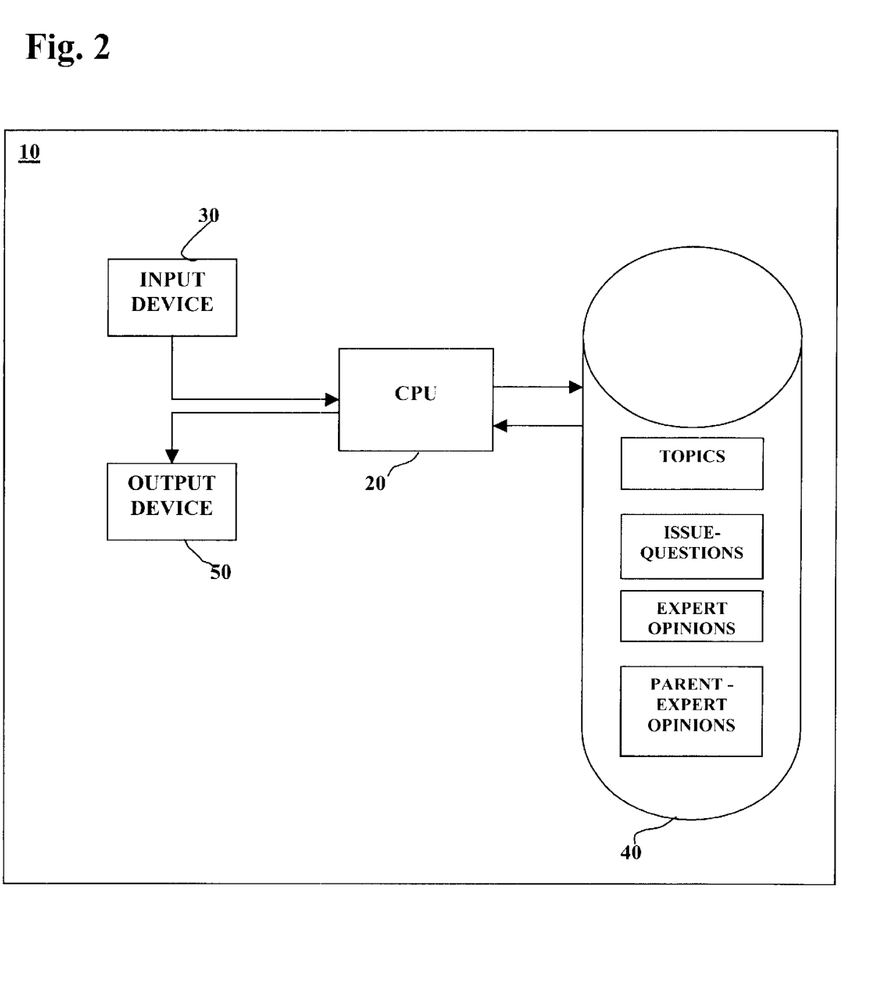
FIG. 2 is a block diagram of a general purpose computer on which the present invention maybe operated.

For non-broadcast mediums such as CD-ROM and CBT, the present invention operates in connection with and on a general-purpose computer 10, as depicted in FIG. 2. The computer 10 has a processor including a central processing unit (CPU) 20, an input device 30 such as a keyboard or mouse (including those integrally provided with laptop computers), a memory storage device 40 such as a hard disk unit (HDU), random access memory (RAM), or CD-ROM, and an output device 50 such as a computer monitor, printer, or modem. While the present invention operates in connection with and on a general-purpose computer, it will be obvious to persons skilled in the art that the computer 10 in connection with which the present invention is used may contain additional components and peripheral devices.

Once the topic groups are identified, they are stored in the computer memory, preferably in a database on the HDU or CD-ROM. The issue-questions are also stored on the HDU or CD-ROM. The issue-questions are still presented to the expert panel and to the parent-expert panel to develop the various answer-options (i.e., expert opinions) on the issue-questions. These answer-options are recorded and also stored in a database on the HDU or CD-ROM. Using the input device 30, a user of the present invention first selects a specific topic from a list of topics, and then an issue-question from a list of "frequently asked questions" (i.e., FAQs) directed to the selected topic. The computer 10 retrieves the expert opinions and parent-expert opinions for the selected issue-question and communicates these opinions to the computer output device 50 as answer-options for consideration by the user. The user may then select another topic, or another issue-question directed to the previously selected topic. The answer-options may be presented in a variety of formats including text only, text and non-animated graphics, text and animated graphics, text and video, video and audio, and various other formats.

Obviously, not every user is interested in the same topics and questions. Issues important to the parents of a toddler will not be the same issues that are important to a teenager. The present invention provides an input mask that consists of criteria entered by the user and that identifies the specific needs and interests of that particular user. The input mask will consider the criteria and operate as a filter or overlay to the various data stored in the database. Thus, user-specific information can be retrieved to provide an information product in the form of answer-options that are directed specifically to the user. Information entered by the user, including the user's age and geographic location, are used to comprise the input mask so that only information directed to the specific user's child-rearing and development needs is provided. The user may also select which answer-options should be provided, e.g., all answer-options, experts only, parent-experts only, etc. Thus, the information product provided by the present invention is customizable by the user and may be tailored to address those issues identified by the user as the most important. The user may enter criteria for the input mask either before or after selecting a specific issue-question.

While the user may identify a specific issue, he/she may not know what questions to ask. The input mask of the present invention may operate as a query tool to assist the user in identifying specific questions. For example, a parent may have a toilet-training issue for a four-year old. The answer-options for this parent are distinctly different than those for the parent of a two-year old. Thus, the parent can enter the child's age as a variable criterion for the input mask and the present invention will consider this information when querying the stored information (e.g., issue-questions, expert opinions and parent-expert opinions) to retrieve only that information directed to this specific parent's concern with his/her four-year old.

As an alternative to selecting an issue-question, the user may also submit a free-form question in ordinary English or other languages specified. This method is more convenient for the user who may have difficulty identifying appropriate keywords for a search. Another advantage of this approach is that retrieval results using the present invention can be more relevant than those generated by well-known keyword matching techniques. These techniques simply scan text to identify keywords and retrieve documents that contain the keywords.

Typically, keyword searches retrieve many irrelevant results. For example, if the parent's question concerns a child's nervousness before participatory sports events, a typical keyword search might use the keywords "parents+sports+behavior." A search using these keywords generated no matches on several parent information web sites. On another parent information web site, the responses retrieved by the search were an article entitled "The Importance Of Having A Real Meal Together As A Family" and a book entitled "Caring For Your School Age Child: Ages 5 to 12." These retrievals do not provide a ready answer to a user's question.

As another example, the user might type in the following: "I was walking one night with no one but my infant. We turned the corner, the street was dark. I was alone on the street. I thought I heard a noise in the street and out of nowhere I was mugged . How can I keep my child safe?" Standard search engines would scan this paragraph and retrieve the keyword "street". Documents which contained the word "street" would be retrieved. The present invention would derive the topic "crime" from this paragraph and generate a search on "crime."

The present invention resolves the problem posed by conventional keyword scan and matching techniques, and enables the user to enter a free-form question, by using a combination of Bayesian inference and information theory to determine the context of the question asked and to use this derived context to generate an appropriate topic or issue-question.

Bayes' theorem gives the rule for updating belief in Hypothesis H (i.e. the probability of H) given additional evidence E, and background information (context) I. In other words, Bayes' theorem reasons back from events to causes. We can derive the probability of a particular cause, given the probability of a particular effect.

This is expressed by the equation:

$$p(H|E,I)=p(H|I)*p(E|H,I)/p(E|I)$$

The left-hand term, p(H|E,I) is called the posterior probability, and it gives the probability of the hypothesis H after considering the effect of evidence E in context I. The p(H|I) term is just the prior probability of H given I alone; that is, the belief in H before the evidence E is considered. The term p(E|H,I) is called the likelihood, and it gives the probability of the evidence assuming the hypothesis H and background information I is true. The last term, 1/p(E|I), is independent of H, and can be regarded as a normalizing or scaling constant. The information I is a conjunction of (at least) all the other statements relevant to determining p(H|I) and p(E|I). New pieces of evidence can be factored into the calculation. As each new piece of evidence is factored in, its effect is conditional on all the previously considered evidence.

The context search engine in the processor of the present invention applies Bayes' theory to identifying the context of a free form question. The engine treats words within the question as abstract symbols with mathematical relationships based on probability. When the search engine identifies a cluster of related words, it also derives the probability that the "cause" or reason for the cluster, is the presence of a particular context.

The following example demonstrates how this is accomplished. A parent might ask the question, "What is the best nipple to use for bottle feeding formula to a baby?" A traditional keyword search might retrieve documents related to chemical formulae or female anatomy. In contrast, the context search engine determines the probabilities that given the simultaneous presence of this particular word cluster, the context is for example: 1) female anatomy, 2) chemistry, or 3) bottle feeding. The search engine calculates that the probability for the context of bottle-feeding is greatest and therefore the issue-questions and related answer-options for that topic are presented to the user.

The context search engine also "spiders" web sites with the same focus as the identified issue-question. Spidering supplies the user with a deeper and richer answer-option, that the user can peruse, based on the user's individual interest. The themes identified in spidered documents are also used to generate categories for the documents, providing a directory of hyperlinks.

Use of the foregoing methods will occasionally retrieve answer-options some of which may be at odds with a user's values, beliefs, or moral code. These answer-options are not useful or could be annoying or offensive to the user. In one embodiment, in order to retrieve answer-options which are most in accord with a user's values, a value profile is developed for the user. This is accomplished by asking questions which reveal what most matters to the user. A sample question would be:

When your child earns a good grade in school, you usually
i. buy your child a special treat
ii. give your child a hug
iii. tell your child it is what you expect
iv. praise your child verbally Based on the user's answers, the user's altruism, materialism, personal style, and belief system can be discerned. Because answer-options are also coded to indicate the values they reflect, answer options reflecting the user's values profile can be identified, and only these are displayed to the user. For example if a user chose the answer "buy your child a special treat" the user would be coded "M" for materialistic and would only see opinions that were also coded "M" and reflected this value.

In addition to filtering answer options based on the user's values, the current invention also filters answer-options so that clearly different choices are presented to the user. For example, the question "Should 8-year-olds get trophies for playing" could evoke the following answer options:

a. Providing trophies to all participants makes a trophy meaningless.
b. Providing trophies to all children takes away from the value of a trophy.

For all intents and purposes, these answer-options are identical in content. The current invention identifies answer-options that are very similar or identical, and only displays one of them. In this way, the user is always provided with at least four opinions, practical and professional, which state significantly different points of view and the user's time is not wasted viewing duplicate answers.

In a first process, a copy-editor scans the answer-options, and based on a set of predetermined criteria, identifies very similar answer-options as duplicate answers. For example, all answer-options which instruct the parent to provide a child who earns good grades with a monetary reward are identified as duplicate answers. Only one of the duplicate answers is displayed.

Similar answers can differ as to tone or suggestions offered and manual overview provides the ability to identify these significant subtleties. For example, given the following question, "the team mother wants to give all the children trophies for playing, what do you recommend?", three of four respondents expressed that it was inappropriate to give trophies. However, even at the summary level, the answer-options vary considerably, as indicated below:

Response 1
Give the team mother suggestions for appropriate tokens of participation: computer-generated certificates, store-bought certificates, a big sticker, gift certificates to a local ice cream or pizza parlor, etc.
Response 2
I suggest that the coach meet with the team after practice and give verbal praise for successful plays during the game.
Response 3
One coach I know takes the time after every game to write a letter to every child on his team detailing how they played and encouraging their efforts.

The answer detail for Response 3 illustrates an even greater difference in philosophy from Response 1. In the detail, the third respondent goes on to say, "Today, children expect a reward for everything—rather than the good feeling of doing something." This respondent does not feel any material reward is appropriate. Accordingly, in this case, none of the responses would be considered a duplicate and eliminated.

In a second process, answer-options are coded to reflect their content. This is accomplished both manually and automatically. For example, an answer-option is coded "MR" for monetary reward. All answer-options coded MR are identified as duplicate answers and only one of the duplicate answers is displayed. Alternatively, answers may be coded simply as negative or positive in nature.

For many questions, it is not be possible to immediately provide a set of answer options. This is particularly the case where questions are highly specific and therefore, could not have been anticipated. An exception report identifies all questions without answer-options as well as answers that have not been approved for display due to error, inappropriateness, or other problems. All questions are date/time stamped. Unanswered questions are submitted to consultants in accordance with an on-call schedule. Via email, consultants are notified of the date/time return requirements for the answers.

Consultants respond to the questions via email within 36 hours or other short time frame. The responses are staged, i.e. sorted in order of time submitted with the oldest being addressed first, and reviewed by a team of copy editors for grammatical and other errors. The reviewed responses are then loaded into the database.

Within 48 hours of the time a question has been submitted, or other relatively brief time period, the user receives an email containing a link. The link reconnects the user to the original site and notifies the user that answer-options to the user's question are presently available on the site.

Although not yet available, interactive television will provide another medium for the implementation of the present invention. Interactive television will provide a means by which viewers can interactively pose questions to the experts and to the parent-experts, who will, in turn, provide a plurality of answer-options in the form of their respective opinions on the issue-question. In this way, information provided by the present invention is specifically directed to the viewer, significantly increasing its relevance, importance, and value.

Information provided in accordance with the present invention may also be communicated via a customized newsletter. Specific information including the child's birth date is used to provide to the user information specifically directed to issues for that particular child's development. The newsletter also includes the numerous opinions of the experts and parent-experts that provide various answer-options to the user. As discussed hereinafter in greater detail, the newsletter response forms, in effect, a composite opinion containing both professional and practical expert advice components that are polycentric and tailored to the specific issue-question presented by the user.

By taking into account the variables that determine which topics and issues are most important to caregivers and children (e.g., child's age, location of the family (i.e., city, suburb, country, etc.), socioeconomic class of the family, etc.), and by considering these variables when identifying the topic groups and issue-questions, the present invention provides a method of providing information to a user, viewer, caregiver, child, etc. that is specifically directed to their immediate and pressing concerns. In other words, the information provided by the present invention is tailored to its audience. Information of this specificity has heretofore been unavailable. Significantly, the information provided by the present invention is polycentric, in that it provides numerous viewpoints (i.e., answer-options) on the topics and issues that have been identified as being most important to the target audience.

The development of topic groups and issue questions is significantly enhanced by use of the context search engine. In certain cases, such as those wherein non-expert opinions are not readily obtained, a focused response generated by the context search engine can be usefully based on expert opinions, solely. The provision of a plurality of expert opinions that collectively present various perspectives in the form of a focused response comprising a polycentric information product tailored to a single issue-question has heretofore not been available from a single source, as is the case with the present invention.

Over time, as the database continues to grow. content in various topic areas becomes substantial. As a result, content related to Youth/Sports, Education, or Teens for example, may be extracted to form separate content databases which will be licensed to niche and affinity groups. These self-generating databases will supply ready-made content, at far less cost, than hiring a copy-editor to provide the content. In this way, the current method and system provides a dynamic, growing database that is self-adapting, and continuously develops facility for furnishing answer-options to issue-questions in content areas tangential to child development or even unrelated to the topic. For example, retirees, aging baby boomers, and investors are affinity groups who will also be served by the present invention. These groups share the same need as parents for customized advice.

Having thus described the invention in rather full detail, it will be recognized that such detail need not be strictly adhered to but that various changes and modifications may suggest themselves to one skilled in the art, all falling within the scope of the invention, as defined by the subjoined claims.

What is claimed is:

1. A method of providing to a user a plurality of answer-options to an issue-question relating to child development, in a computer having a processor, an input device, a memory storage device and an output device, said method comprising the steps of:

(a) identifying and storing in the memory storage device a plurality of topics relating to child development;

(b) developing and storing in the memory storage device a plurality of issue-questions directed to each of the stored topics;

(c) developing and storing in the memory storage device an expert opinion for each issue-question;

(d) developing and storing in the memory storage device a parent-expert opinion for each issue-question;

(e) selecting, by the user via the input device, a topic;

(f) selecting, by the user via the input device, an issue-question directed to the selected topic; and (g) providing to the computer output device a plurality of answer-options to the selected issue-question, the plurality of answer-options comprising at least one expert opinion and one parent-expert opinion.

2. A method as recited by claim 1, wherein said step (a) comprises gathering data relating to child development from a plurality of sources including survey data and focus group data and storing the gathered data in the memory storage device.

3. A method as recited by claim 1, wherein said step (b) comprises gathering data relating to child development from a plurality of sources including survey data and focus group data and storing the gathered data in the memory storage device.

4. A method as recited by claim 1, wherein said step (c) comprises presenting each issue-question to an expert and storing the expert's answer in the memory storage device.

5. A method as recited by claim 1, wherein said step (d) comprises presenting each issue-question to a parent-expert and storing the parent-expert's answer in the memory storage device.

6. A method of providing a plurality of answer-options to an issue-question relating to child development, said method comprising the steps of:

(a) identifying a plurality of topics relating to child development based upon predetermined criteria;

(b) developing and recording a plurality of issue-questions directed to each of the identified child development topics;

(c) developing and recording an expert opinion for each issue-question;

(d) developing and recording a parent-expert opinion for each issue-question;

(e) selecting a topic;

(f) selecting an issue-question directed to the selected topic; and (g) communicating a plurality of answer-options to the selected issue-question, the plurality of answer-options comprising at least one expert opinion and one parent-expert opinion and being communicated orally, in writing, or electronically.

7. A method as recited by claim 6, wherein said step (a) comprises gathering data relating to child development from a plurality of sources including survey data and focus group data.

8. A method as recited by claim 6, wherein said step (b) comprises gathering data relating to child development from a plurality of sources including survey data and focus group data.

9. A method as recited by claim 6, wherein said step (c) comprises presenting each issue-question to an expert.

10. A method as recited by claim 6, wherein said step (d) comprises presenting each issue-question to a parent-expert.

11. A method as recited by claim 6, wherein said step (g) further comprises broadcasting the plurality of answer-options using a television medium.

12. A method as recited by claim 6, wherein said step (g) further comprises recording the plurality of answer-options on a videotape.

13. A method as recited by claim 6, wherein said step (g) further comprises recording the plurality of answer-options on a DVD.

14. A method of providing to a user a program a polycentric information product concerning a child development issue, in a computer having a processor, an input device, a memory storage device and an output device, said method comprising the steps of:
  (a) developing and recording in a database on the memory storage device a first data set containing a plurality of topics relating to child development;
  (b) developing and recording in said database a second data set containing a plurality of issue-questions directed to each of said topics;
  (c) developing and recording in said database a third data set containing an expert opinion for each issue-question;
  (d) developing and recording in said database a fourth data set containing a parent-expert opinion for each issue-question;
  (e) selecting from said database, by the user via the input device, a topic;
  (f) selecting from said database, by the user via the input device, an issue-question pertinent to at least one selected topic, said selected topic and issue-question comprising a primary information product;
  (g) modifying said primary information product by imposing thereon a plurality of answer-options to the selected issue-question, the plurality of answer-options comprising at least one expert opinion and one parent-expert opinion to thereby produce a polycentric information product; and
  (h) communicating to the user via the computer output device said polycentric information product by oral, written or electronic means.

15. A method as recited by claim 14, wherein said step (a) comprises gathering data relating to child development from a plurality of sources including survey data and focus group data and storing the gathered data in the memory storage device.

16. A method as recited by claim 14, wherein said step (b) comprises gathering data relating to child development from a plurality of sources including survey data and focus group data and storing the gathered data in the memory storage device.

17. A method as recited by claim 14, wherein said step (c) comprises presenting each issue-question to an expert and storing the expert's answer in the memory storage device.

18. A method as recited by claim 14, wherein said step (d) comprises presenting each issue-question to a parent-expert and storing the parent-expert's answer in the memory storage device.

19. A method of providing to a user a plurality of answer-options comprised of an expert opinion and a parent-expert opinion on an issue-question and relating to child development, the answer-options, expert opinion, parent-expert opinion, and issue-questions being stored in a memory storage device of a computer having a processor, an input device, and an output device, said method comprising the steps of:
  (a) selecting, by the user via the input device, a topic from a list of topics stored in the memory storage device;
  (b) constructing an input mask by entering, by the user via the input device, a variable criterion;
  (c) identifying a plurality of issue-questions that satisfy the variable criterion using the input mask;
  (d) identifying a plurality of answer-options to the identified issue-questions; and
  (e) providing to the computer output device the plurality of answer-options.

20. A method as recited by claim 19, wherein said step (b) comprises entering, by the user, information specific to the user including a child's age and the user's geographic location.

21. A method as recited by claim 1, wherein a copy-editor evaluates each answer-option for content, and eliminates those answer-options with the same content, such that only answer-options which contain unique opinions are displayed to the user.

22. A method as recited by claim 1, wherein each answer-option is assigned a content code and wherein more than one answer-option has the same content code, only one of the answer-options with the same content code is selected for display to the user.

23. A method of providing to a user a plurality of answer-options comprised of an expert opinion and a parent-expert opinion on an issue-question and relating to child development, the answer-options, expert opinion, parent-expert opinion, and issue-questions being stored in a memory storage device of a computer having a processor, an input device and an output device, said method comprising the steps of:
  (a) selecting, by the user via the input device, a topic from a list of topics stored in the memory storage device;
  (b) submitting an issue-question in free-form, by the user via the input device;
  (c) editing the issue-question for proper grammar and form;
  (d) constructing a plurality of answer-options to the issue-question;
  (e) loading the answer-options into a database;
  (f) notifying the user, via an email message, within a predetermined time period, that the plurality of answer-options are available;
  (g) providing a hyperlink, within the email message, to link the user to a web page, from which the user submitted the issue-question, and from which the answer-options can be accessed.

24. A method as recited by claim 23, further including the step of assigning a values code to each answer-option.

25. A method as recited by claim 23, further including the step of asking the user a series of questions, designed to identify the user's value system, and assigning to the user a values code.

26. A method as recited by claim 25, further including the step of filtering the answer-options to the selected issue-question, to include only those answer-options coded with the user's values code.

27. A method of providing to a user a plurality of answer-options comprised of an expert opinion and a parent-expert opinion on an issue-question and relating to child development, the answer-options, expert opinion, parent-expert opinion, and issue-questions being stored in a memory storage device of a computer having a processor, an input device and an output device, said method comprising the steps of:

(a) selecting, by the user via the input device, a topic from a list of topics stored in the memory storage device;

(b) submitting a question in free-form, by the user via the input device;

(c) attempting to match at least one stored issue-question with the submitted question, using in combination Bayesian inference and information theory;

(d) where there is a match, providing to the computer output device a plurality of answer-options to the matched issue-question, the plurality of answer-options comprising at least one expert opinion and one parent-expert opinion.

28. A method as recited in claim 27 wherein the processor matches the free-form question with the issue-question by identifying a cluster of related words within the free-form question and deriving a probability that a reason for the cluster is presence of a particular context, the same context that exists within the issue-question.

29. The method as recited in claim 27 wherein no matched issue-question can be identified, further including the steps of:

(d) constructing a plurality of answer-options to the submitted question;

(e) loading the answer-options into a database;

(f) notifying the user, via an email message, within a predetermined time period, that the plurality of answer-options are available; and providing a hyperlink, within the email message, to link the user to a web page, from which the user submitted the issue-question, and from which the answer-options can be accessed.

30. A method of providing to a user a plurality of answer-options to an issue-question relating to child development, in a computer having a processor, an input device, a memory storage device and an output device, said method comprising the steps of:

(a) identifying and storing in the memory storage device a plurality of topics relating to child development;

(b) developing and storing in the memory storage device a plurality of issue-questions directed to each of the stored topics;

(c) developing and storing in the memory storage device a plurality of expert opinions for each issue-question;

(d) selecting, by the user via the input device, a topic;

(e) selecting, by the user via the input device, an issue-question directed to the selected topic; and providing to the computer output device a plurality of answer-options to the selected issue-question, the plurality of answer-options comprising a plurality of expert opinions and collectively producing a polycentric information product tailored to said issue-question.

31. A method as recited by claim 30, wherein each answer-option is assigned a content code and wherein more than one answer-option has the same content code, only one of the answer-options with the same content code is selected for display to the user.

32. A method of providing to a user a plurality of answer-options comprised of at least two expert opinions on an issue-question and relating to child development, the answer-options, expert opinions, and issue-questions being stored in a memory storage device of a computer having a processor, an input device and an output device, said method comprising the steps of:

(a) selecting, by the user via the input device, a topic from a list of topics stored in the memory storage device;

(b) submitting a question in free-form, by the user via the input device;

(c) attempting to match at least one stored issue-question with the submitted question, using in combination Bayesian inference and information theory; and (d) where there is a match, providing to the computer output device a plurality of answer-options to the matched issue-question, the plurality of answer-options comprising at least two expert opinions.

33. A method as recited in claim 32 wherein the processor matches the free-form question with the issue-question by identifying a cluster of related words within the free-form question and deriving a probability that a reason for the cluster is presence of a particular context, the same context that exists within the issue-question.

34. The method as recited in claim 32 wherein no matched issue-question can be identified, further including the steps of:

(g) constructing a plurality of answer-options to the submitted question;

(h) loading the answer-options into a database;

(i) notifying the user, via an email message, within a predetermined time period, that the plurality of answer-options are available; and providing a hyperlink, within the email message, to link the user to a web page, from which the user submitted the issue-question, and from which the answer-options can be accessed.

* * * * *